Dec. 22, 1964    L. W. JONES    3,162,601
PARAFFIN REMOVAL AND PREVENTION
Filed Jan. 10, 1962
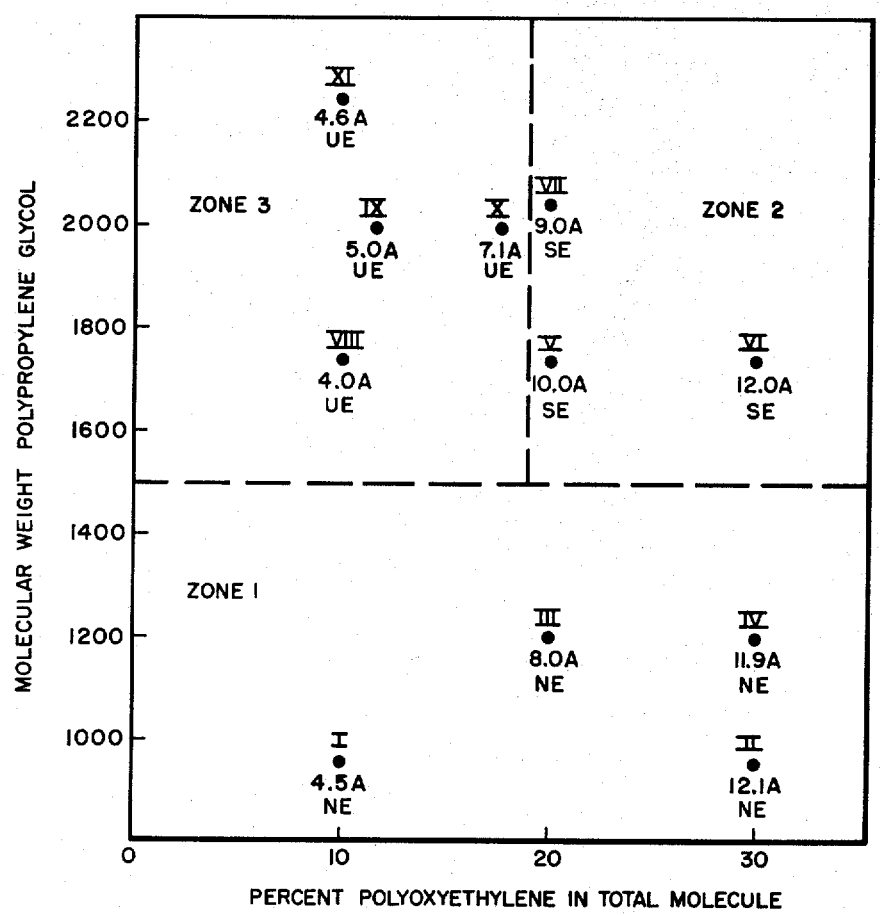
NE = NO EMULSION
UE = UNSTABLE EMULSION
SE = STABLE EMULSION
A = ml ISOOCTYL ALCOHOL TO DISSOLVE 10 ml OXYETHYLATED POLYPROPYLENE GLYCOL
INVENTOR.
LOYD W. JONES
BY Buell B. Hamilton
ATTORNEY

United States Patent Office 3,162,601
Patented Dec. 22, 1964

3,162,601
PARAFFIN REMOVAL AND PREVENTION
Loyd W. Jones, Tulsa, Okla., assignor to Pan American Petroleum Corporation, Tulsa, Okla., a corporation of Delaware
Filed Jan. 10, 1962, Ser. No. 165,388
9 Claims. (Cl. 252—8.3)

This invention relates to removing paraffin from surfaces of pipes or from other surfaces. More particularly it relates to removing paraffin from flow lines in oil fields and from the oil-producing formation and well tubing in oil wells.

Paraffin frequently deposits from the oil in oil wells and in flow lines from the wells to tanks and the like. The paraffin may adhere to surfaces of the formation or tubing in the well and to the walls of the flow lines. This decreases and sometimes prevents flow of oil through the formation, well tubing, and flow lines.

An object of this invention is to provide a composition and method for removing paraffin from wells and flow lines. Another object of the invention is to prevent the deposition of paraffin on surfaces exposed to paraffin-containing oil and to remove any small amount of paraffin which may deposit in spite of efforts to prevent deposition.

In general, my invention is based on the discovery that paraffin deposits are frequently made up not only of paraffin hydrocarbons, but that such deposits contain considerable quantities of water. The paraffin deposits in such cases are water-in-paraffin emulsions. I remove such paraffin deposits by breaking the water-in-paraffin emulsions and forming temporary paraffin-in-water emulsions which are then easily swept from the formation, the well, or the flow line.

Three problems had to be overcome. First, a material had to be found which would break the water-in-paraffin emulsion. Second, the emulsion breaker had to form a paraffin-in-water emulsion strong enough to disperse and remove the paraffin, but not strong enough to form a permanent water-in-oil emulsion. Third, the additive had to be brought to the paraffin-water interface through the continuous paraffin phase, even though it was water soluble, in order to form an oil-in-water emulsion.

The drawing is a chart outlining the type of agent suitable for overcoming these problems.

The first two problems are solved by use of ethoxylated polypropylene glycol. These materials are prepared by reacting propylene oxide with propylene glycol to form polypropylene glycol in which the propylene groups are connected by ether linkages and each molecule has a hydroxyl group on each end. The polypropylene glycol ends are then reacted with ethylene oxide. The reactions add a polyoxyethylene chain to each end of the molecule, again through ether linkages. The resulting material may be called ethoxylated or oxyethylated polypropylene glycol. For purposes of brevity and convenience it will generally be referred to as a polyether.

For my purposes both the molecular weight of the polypropylene glycol and the ratio of this glycol to polyoxyethylene must be within narrow limits. By observing these limits it is possible to break water-in-paraffin emulsions and form paraffin-in-water emulsions. In the preferred form of my invention, the paraffin-in-water emulsifying tendency is controlled by the concentration of the additive. A concentration high enough to form the emulsion is used. The emulsion is diluted with oil until the emulsion breaks.

The third problem, that of transporting the water soluble polyether through the continuous oil phase to the paraffin-water interface, is solved by using a monohydric aliphatic alcohol within a limited range of molecular weights. Preferably iso-octyl alcohol is used for solubilizing the polyether in the oil phase. Alcohols having from about six to about ten carbon atoms per molecule can be used. Lower molecular weight alcohols do not become sufficiently firmly associated with the polyether to prevent loss of the alcohol to any water which may be present. When this loss occurs, the solubilizing action of the alcohol on the polyether is also lost and the polyether cannot effectively reach the paraffin-water interface through the continuous paraffin phase. When the alcohol molecular weight is too high, on the other hand, the water soluble polyether may not even be soluble in the alcohol, much less in the alcohol-paraffin combination.

It is also to be noted that the alcohol must become rather firmly associated with the polyether in order to solubilize the polyether in oil and paraffin. If the alcohol is to solubilize the polyether, it must be more nonpolar than the polyether. Therefore, the associated alcohol and polyether necessarily are less polar than the polyether. An alcohol of too high a molecular weight, therefore, exerts too great an effect on the polar nature of the polyether. To avoid these adverse effects, the monohydric aliphatic alcohol should contain no more than about ten carbon atoms and no less than about six carbon atoms.

The nature of the polyether and its limits for my purposes can best be understood by reference to the following examples:

EXAMPLE I

To determine the emulsifying tendencies of various ethoxylated polypropylene glycols and the amounts of alcohol required to solubilize these various materials in oil, eleven polyethers were selected. These were based on polypropylene glycols having different molecular weights and containing various percentages of polyoxyethylene. In a test of each of these compounds ten milliliters of the polyether were added to eighty milliliters of a liquid petroleum fraction containing predominantly hydrocarbons having from ten to twelve carbon atoms per molecule. This fraction is generally referred to as a $C_{10}$–$C_{12}$ hydrocarbon. The mixture was stirred while iso-octyl alcohol was added slowly until the hazy or opaque dispersion was converted into a clear and transparent solution. The amount of alcohol required for each polyether is reported in Table A.

In one series of tests a small sample of each solution was diluted with $C_{10}$–$C_{12}$ hydrocarbons to form a second solution containing about one percent of the combination of polyether and alcohol. About fifty milliliters of each of these solutions was shaken vigorously with about fifty milliliters of five percent sodium chloride brine and the time for separation of phases was noted. The results of this series of tests are presented in Table A.

In another series of tests five percent sodium chloride brine was added to the remainder of the first solution containing about ten percent polyether. Addition of the brine was continued until an emulsion formed or until fifty milliliters of brine had been added. If an emulsion formed, the quantity of water required to cause emulsion formation was recorded. The results of this series of tests are also reported in Table A.

*Table A*

| Polyether | | | Alcohol to Form Clear Solution | Water to Cause Emulsion in 10% solution, ml. | Separation time for 1% solution and water, sec. |
|---|---|---|---|---|---|
| Compound No. | Mol. wt. PPG [1] | Percent POE [2] | | | |
| I | 950 | 10 | 4.5 | [3] 50 | 68 |
| II | 950 | 30 | 12.1 | [3] 50 | 6 |
| III | 1,200 | 20 | 8.0 | [3] 50 | 68 |
| IV | 1,200 | 30 | 11.9 | [3] 50 | 8 |
| V | 1,750 | 20 | 10.0 | 15 | [4] |
| VI | 1,750 | 30 | 9.0 | 10 | [4] |
| VII | 2,050 | 20 | 9.0 | 5 | [4] |
| VIII | 1,750 | 10 | 4.0 | 29 | 4 |
| IX | 2,000 | 12 | 5.0 | 40 | 35 |
| X | 2,000 | 18 | 7.1 | 30 | 25 |
| XI | 2,250 | 10 | 4.6 | 30 | 4 |

[1] PPG is polypropylene glycol.
[2] POE is polyoxyethylene.
[3] No emulsion.
[4] Stable emulsion.

A study of the amount of alcohol required to produce a clear solution of ten milliliters of each of the various polyethers in eighty milliliters of $C_{10}$–$C_{12}$ hydrocarbons shows that compounds containing about ten percent polyoxyethylene required about four to five milliliters of alcohol. Compounds with twenty percent polyoxyethylene required about twice as much alcohol, or from about eight to ten milliliters. Not quite three times as much alcohol was required for the thirty percent polyoxyethylene compounds as for some of the ten percent polyoxyethylene polyethers. The amount of alcohol to solubilize these highly ethoxylated compounds amounted to about twelve milliliters. The rough proportion between percent of polyoxyethylene in a polyether and the amount of alcohol required to solubilize about ten percent of the polyether in a hydrocarbon liquid solvent is apparent. This proportion is not quite as pronounced for lower concentrations of polyethers as will be shown in Example II.

In Table A it is shown that polyethers formed by ethoxylating low molecular weight polypropylene glycols do not form stable emulsions with brine. When brine was mixed with Compounds I, II, III, and IV and the mixtures were stirred vigorously, the brine seemed to disperse fairly readily into the oil phase; but when agitation was stopped, the two phases separated readily. This was true for both the ten percent and one percent solutions of polyether in oil. It was also true whether the polyoxyethylene content was ten percent, twenty percent, or thirty percent.

When ethoxylated higher molecular weight polypropylene glycols were agitated with brine, however, the materials could be divided into two groups depending upon the percent of polyoxyethylene in the molecules. Both concentrated and dilute solutions in oil formed stable emulsions with brine when the high molecular weight polyethers contained twenty percent or more of polyoxyethylene. When the high molecular weight polyethers contained eighteen percent or less polyoxyethylene, however, only the concentrated oil solutions formed stable emulsions with brine. The dilute oil solutions separated quickly from the brine.

From the data in Table A it will be apparent that the polyethers can be divided into three groups. These are represented in the drawing by Zones 1, 2, and 3. Zone 1 includes low molecular weight Compounds I, II, III, and IV. These compounds are, of course, merely representative of an infinite number of compounds within this zone. The same is true of the examples of compounds in the other zones. Oil solutions of these compounds do not form stable emulsions with brines. Therefore, they are relatively ineffective for emulsifying and thus removing paraffin from wells, flow lines, and the like. Zone 2 shown in the drawing includes Compounds V, VI, and VII. Oil solutions of these highly ethoxylated high molecular weight polyethers do form stable emulsions, with oil and brine. They can, therefore, be used to emulsify and remove paraffin. The emulsions formed by this group of materials are too stable, however, for use in all cases. These emulsions frequently persist even when highly diluted with oil. As a result, the oil is contaminated with a permanent emulsion. Polyethers in Zone 3 of the drawing represented by Compounds VIII, IX, X, and XI also form stable emulsions when used in high concentrations in oil. They can, therefore, emulsify and remove paraffin. When these emulsions are diluted with oil, however, a concentration of polyether is quickly reached where the emulsion is no longer stable. The emulsion breaks and the water separates from the oil, thus avoiding emulsion problem.

The ethoxylated polypropylene glycols seem to be unique among the surface active agents for my purposes. For example, the ethoxylated nonyl phenols having from about eight to ten molecules of ethylene oxide per mol of nonyl phenol can be solubilized in oil by iso-octyl alcohol, hexyl alcohol, and the like. These surface active agents also penetrate the continuous paraffin phase of water-in-paraffin emulsions and disperse the paraffin in water as paraffin-in-water emulsions. As in the case of the highly ethoxylated high molecular weight polyethers, however, these paraffin-in-water emulsions are quite stable over a very wide range of surface active agent concentrations. In general the emulsion problem is much more serious than with my class of polyethers.

EXAMPLE II

To determine how the necessary amount of solubilizing alcohol varies with the concentration of polyether in oil, some of the compounds used in Example I were dissolved in $C_{10}$–$C_{12}$ hydrocarbons in a lower concentration. In this case only two milliliters of each polyether was stirred with eighty milliliters of $C_{10}$–$C_{12}$ hydrocarbons and iso-octyl alcohol was added slowly until a clear transparent solution was formed. The results of these tests are reported in Table B.

*Table B*

| Polyether | | | Alcohol to Form Clear Solution | | | |
|---|---|---|---|---|---|---|
| Compound No. | mol. wt. PPG [1] | Percent POE [2] | 10% Polyether Soln. | | 2% Polyether Soln. | |
| | | | ml. | Ratio [3] | ml. | Ratio [3] |
| I | 950 | 10 | 4.5 | .45 | 3.7 | 1.85 |
| II | 950 | 30 | 12.1 | 1.21 | 7.9 | 3.95 |
| III | 1,200 | 20 | 8.0 | .80 | 6.4 | 3.20 |
| IV | 1,200 | 30 | 11.9 | 1.19 | 7.9 | 3.95 |
| V | 1,750 | 20 | 10.0 | 1.00 | 7.4 | 3.70 |
| VI | 1,750 | 30 | 9.0 | .90 | 8.6 | 4.30 |
| VII | 2,050 | 20 | 9.0 | .90 | 7.7 | 3.85 |
| VIII | 1,750 | 10 | 4.0 | .40 | 2.9 | 1.45 |
| IX | 2,000 | 12 | 5.0 | .50 | 3.0 | 1.50 |

[1] PPG is polypropylene glycol.
[2] POE is polyoxyethylene.
[3] Ratio is that of alcohol to polyether.

It will be apparent from the data in Table B that there is no fixed ratio of alcohol to polyether. On the contrary the concentration of alcohol required to form clear transparent solutions depends to a remarkably small extent on polyether concentration. The alcohol concentration seems to be much more dependent on the polyoxyethylene content of the polyethers than on anything else. Since the ratio of alcohol to polyether is higher for the lower concentrations of polyether, this means that when a clear concentrated solution is diluted, there may be insufficient alcohol present to maintain a clear solution. Experience has shown this to be true. The more dilute solution becomes distinctly hazy and translucent. The particles causing the haziness do not, however, appear to settle from the oil solution. Instead, they remain well dispersed over long periods of time in an apparently stable dispersion. Experience also has shown that these dispersions are at least almost as effective as the clear solutions in breaking water-in-paraffin emulsions.

A possible theoretical explanation of the action is that the oil soluble alcohol and the water soluble polyether become associated in the oil phase. If the ratio of alcohol to polyether is sufficiently high, the molecules become oriented in well-order micelles. If sufficient alcohol is not present, insufficient orientation of molecules takes place to form micelles. Instead, larger aggregates of polyether and alcohol form. If micelles form, these are within the usual range of sizes smaller than the wave length of visible light so the solution appears clear. If the unoriented aggregates of alcohol and polyether form, however, because of a deficiency of alcohol, then the particles are apparently sufficiently large to interfere with the transmission of light so the solution appears hazy or translucent. The large aggregates apparently are quite stable and are almost equally as effective as the smaller micelles in transporting the water soluble polyethers through the oil and paraffin continuous phase to the oil-water interface.

The explanation of the variation in the ratio of alcohol to polyether with changing concentration may lie in the solubilities of the alcohol in the oil. The alcohol is distributed between the oil and the micelles or aggregates. If more oil is introduced to decrease the concentration of the polyether, more of the alcohol passes into true solution in the oil. This removes alcohol from micelles. When the concentration of alcohol in the micelles drops below a certain critical minimum the molecules in the micelles lose their orientation and become associated into large aggregates. These contain too much polyether to form micelles and too much alcohol to separate from the oil phase.

This theory also presents a possible explanation for another observation. The figures in the tables apply to solutions of polyethers and alcohols in a particular hydrocarbon solvent. It has been found that the amount of alcohol required to form a clear solution in hydrocarbon solvents varies with the solvent. The nature of the solvent affects the solubility of the alcohol in the solvent. This in turn affects the equilibrium between the alcohol in true solution and that present in micelles. The result is a change in the amount of alcohol required to form clear solutions of polyethers.

While the above theories are believed to offer the most reasonable explanation of the observed behavior of the alcohols and polyethers in oil solutions, it will be understood that I do not wish to be bound by the theories.

Before describing examples of various applications of my invention, it seems advisable to describe these applications in general terms. First, it should be pointed out that while compounds in Zone 3 of the drawing are preferred for paraffin removal, materials in the other two zones can also be used under certain circumstances. A paraffin problem may be of two types. It may be a soft emulsion containing about ten to twenty percent water, for example, or it may be a hard deposit containing little water, such as about one percent.

In the case of the soft emulsions it is frequently necessary only to break the emulsion. The emulsion, upon breaking, disperses the paraffin in finely divided form in any oil which is present. Some dispersion in water may also take place. The dispersion is usually sufficiently stable to permit removal from wells. Zone 1 compounds break water-in-paraffin emulsions. They do not, however, form stable paraffin-in-water emulsions. Nevertheless, these Zone 1 compounds can sometimes be used for paraffin removal where the principal problem is breaking the water-in-paraffin emulsion and where removal of the resulting oil or water dispersion of paraffin is no particular problem. This is particularly true of shallow wells where a large volume of oil is produced. The advantage of using compounds in Zone 3 will be apparent since the formation of the unstable emulsion of paraffin in water makes more certain removal of the paraffin from the well.

It is to be noted that where the paraffin exists as a soft high-water emulsion, a very low concentration, such as about 0.1 percent of polyether is generally employed to break the emulsion. This means that neither Zone 3 nor Zone 1 compounds form stable emulsions of paraffin in water. This observation may be misleading. Oil and paraffin still do disperse in the water but the dispersions are simply unstable, permitting the two phases to separate easily when not agitated. There is generally far more than enough agitation in a producing well or in a flow line to prevent premature breaking of the unstable dispersions formed by low concentrations of compounds in Zones 1 and 3 of the drawing.

Paraffin emulsions may be not only removed, but also prevented from forming. This is difficult to do in a flow line but may be arranged in many wells. Some wells can be operated with considerable oil in the bottom of the well. A quantity of polyether can be introduced into this oil. This polyether finds its way slowly into produced oil preventing the formation of water-in-paraffin emulsions. The polyethers also break, or prevent formation of, many water-in-oil emulsions even where paraffin is not a problem. It will be apparent, therefore, that my polyethers in Zones 1 and 3 and the techniques described above for preventing paraffin emulsions can also be used to prevent formation of water-in-oil emulsions in wells.

Soft high-water paraffin emulsions can also be broken by use of Zone 2 compounds. Use of this class of compounds is usually avoided, however, because of the stable paraffin-in-water emulsions which are usually formed. It is sometimes considered advisable, for example, to force a dilute oil solution of the polyethers and solubilizing alcohol into an oil producing formation. The object is to remove any paraffin which may be deposited on the surfaces of the pores of the formation. If paraffin is present in the formation pores and if compounds in Zone 2 of the drawing are forced into the formation, there is danger of forming paraffin-in-water emulsions which may decrease the formation permeability. The compounds may also form troublesome oil-in-water emulsions. If Zone 2 compounds are used in wells to remove either soft or hard paraffin, care should be exercised not to inject the compounds into the formations.

When hard, low-water paraffin is to be removed, low concentrations of compounds in Zones 1, 2, or 3 may be used. If enough low concentration solution is employed, followed by water, or if the operation is repeated enough times, even hard paraffin will be removed. It is greatly preferred, however, to employ solutions containing at least about ten percent of the combination of polyethers and alcohol to remove hard paraffin deposits. The polyethers and alcohol should be allowed to stand in contact with the paraffin for at least a short time, such as five to fifteen minutes. Longer soaking times, such as two to twenty-four hours, should be allowed for very thick and unusually hard paraffin deposits.

After the soaking period, a water flush should be employed to emulsify the paraffin and remove it. The water need not be oil free. Thus, in a well if the production contains at least about ten percent of water, simply producing the well will ordinarily provide sufficient water to emulsify and carry away the paraffin. As previously noted, when the polyethers break water-in-paraffin emulsions, the paraffin may become dispersed to some extent in oil which is present. Therefore, oil alone can be used in some cases. Water is by far the best and the preferred flushing liquid, however.

In a flow line or pipe line a batch of paraffin removal composition can be pumped slowly through the line and followed by water. The water should flow as rapidly as possible toward the end of the operation to provide sufficient agitation to emulsify the paraffin in the water.

If the paraffin removing composition from a well or line together with the paraffin-in-water emulsion is to be dumped into a disposal pit for burning or the like, then it will be apparent that compounds in either Zone 2 or Zone 3 of the drawing can be used. Both perform the desired action of emulsifying paraffin in water. Compounds in Zone 1 should not ordinarily be used for this application since high concentrations of these polyethers do not form the desired stable emulsions.

Frequently the paraffin removing composition and the paraffin emulsion are allowed to flow to the regular oil storage tank. This is particularly true where a well is allowed to produce to provide the water and oil to flush away the paraffin deposits after the soaking period. In such cases it is usually important to use only compounds in Zone 3 of the drawing to avoid any danger not only of paraffin-in-water emulsions, but of oil-in-water emulsions as well. As previously noted, the Zone 2 compounds are good emulsifiers for oil as well as paraffin in water.

Summarizing these operations, they can be said in general to involve cleaning paraffin from a surface by contacting the paraffin deposit with the combination of alcohol and polyether and then flushing the surface with water, oil, or a mixture of the two. The ratio of alcohol to polyether may vary from about one to three, up to about four to one as shown in Tables A and B. The preferred ratio is about one to two. The concentration of the combination may vary from about 0.1 percent to one hundred percent. In the very low concentrations the amount of polyether should not be less than about 0.05 percent and the amount of alcohol should not be less than about 0.03 percent. The other ingredient in these low concentration solutions is generally a hydrocarbon oil, such as kerosene. In the oil-free compositions, the amount of alcohol should be within the range of about twenty-five to eighty percent by volume and the amount of polyether should be within the range of about twenty to seventy-five percent by volume to stay within the ratio limits stated above. The combinations may contain in addition to the alcohol, polyether and oil, other ingredients such as small amounts of water, other alcohols, acids, paraffin solvents such as carbon tetrachloride, or the like, which do not adversely affect the paraffin removing properties of the composition. Therefore, when a composition is said to consist essentially of certain named ingredients, it will be understood that these compositions may also contain other ingredients which do not substantially adversely affect the ability of the compositions to accomplish their desired actions.

The drawing shows the general divisions between compounds in Zone 1 and those in Zones 2 and 3 to lie at a polypropylene glycol molecular weight of about 1500. The drawing and data indicate the division between Zones 2 and 3 is at about nineteen percent polyoxyethylene. Available data do not indicate any particular upper limit on the molecular weight of the polypropylene glycol which is ethoxylated to obtain the polyethers in Zones 2 and 3 of the drawing. Compound XI based on polypropylene glycol having a molecular weight of about 2250 performed substantially the same as Compound VIII based on a polypropylene glycol of 1750 molecular weight. The behavior of these materials is somewhat unpredictable, however, so an upper limit of about 3500 in the polypropylene glycol molecular weight should be observed to avoid any unexpected adverse effects. Preferably the polyethers should be based on polypropylene glycol such as those shown in the drawing having molecular weights below about 2500.

The lower limit on polypropylene glycol molecular weight should be about 900. This is to insure the required oil solubility of the center portion of the polyether molecules.

The minimum percentage of polyoxyethylene in the molecules of Zones 1 and 3 should be about eight percent. Compounds in Zone 1 of the drawing can contain even smaller quantities, perhaps as low as six percent. For best results, however, the minimum of about eight percent should be observed even for the Zone 1 compounds.

The upper limit on polyoxyethylene content is controlled principally by the decreased solubility in oil. As shown in Table B, compounds containing thirty percent polyoxyethylene may require as much as four times as much alcohol as polyether to solubilize the polyether and form clear, dilute solutions in oil. Therefore, the polyoxyethylene content of the polyethers should not greatly exceed thirty percent. Certainly the amount should not be more than about forty percent. The amounts of polyoxyethylene can be increased, if desired, by including some propylene oxide in the ethylene oxide used in the step of oxyethylation.

When reference is made to the molecular weight of polypropylene glycol, the average molecular weight of a mixture of molecules having this average molecular weight is ordinarily intended. When reference is made to polypropylene glycol having an average molecular weight, therefore, this term is intended to include materials having molecules in either narrow or wide ranges. Likewise, when the average polyoxyethylene content of an ethoxylated polypropylene glycol is said to be a certain value, it will be understood that a mixture is generally intended having molecules in either a narrow or wide range of values, but having an average of the value given.

Having described application of the invention in general and the limits which should be observed, some specific examples of applications can now be presented to better illustrate the invention.

EXAMPLE III

A sample of a rather stiff, pasty paraffin from the Sholem Alechem Field in Oklahoma was trowelled into squares of about sixteen mesh window screen. The squares were about 1½ inches on each size. About one gram of paraffin was added to each screen. Each paraffin filled screen was then soaked for about five minutes in a paraffin removing preparation after which it was placed in a large beaker through which water at 100° F. was circulated slowly. The results are reported in Table C.

*Table C*

| Paraffin Remover | | Results |
|---|---|---|
| No. | Ingredients | |
| 1 | 15 ml. ethoxylated polypropylene glycol, 80 ml. $C_{10}$-$C_{12}$. | Paraffin rapidly removed. More than 90% clean in five minutes. |
| 2 | 25 ml. commercial paraffin remover, 80 ml. kerosene. | Paraffin slowly removed; 50% in about 7 minutes. After about 10 minutes cleaning seemed to increase. |
| 3 | 25 ml. commercial paraffin preventer, 80 ml. $H_2O$. | About 10% lost in 5 minutes. |

In Compound 1 the ethoxylated polypropylene glycol was prepared using a polypropylene glycol having a molecular weight of about 2,000. The polyoxyethylene portion was about twenty-five percent of the total molecules. The effectiveness of this composition in removing paraffin is apparent from the results reported in the table.

Compound 2, the commercially available paraffin removing compound was also effective in removing at least most of the paraffin although the rate and degree of removal were not quite as great as in the case of Compound 1. The exact composition of this commercial compound is not known, but it is reported to be a solution of a relatively oil-soluble, surface active agent in a kerosene fraction of petroleum, specially selected for its high content of aromatic materials.

The principal advertised purpose of Compound 3, the paraffin preventer, is to make metal surfaces water wet so paraffin will not adhere. It is also said to have some effectiveness as a paraffin remover, however. The results of the tests show the very limited effectiveness of this composition in removing paraffin compared to Composition 1. This further emphasizes the effectiveness of Composition 1 for removing paraffin by soaking the paraffin in the composition and then flushing with water.

EXAMPLE IV

In a field in Wyoming the production rate from the lease had dropped due to the deposition of paraffin in the bottoms of the wells. Examination of samples of the paraffin recovered from the wells showed the paraffin to be a soft water-in-paraffin emulsion containing about fifteen to twenty percent water. Personnel in this field decided to attempt removal of the paraffin by using my composition to break the emulsion so the paraffin would be removed from the well by the flow of oil and water. The ethoxylated polypropylene glycol used was that described in Example III. It is to be noted that the twenty-five percent polyoxyethylene places this compound in Zone 2 of the drawing which does not include the preferred group of compounds. The explanation is that this work was started before the advantages of Zone 3 compounds over those in Zone 2 were fully appreciated. A solution of the polyether in alcohol was first prepared containing two parts by volume of the polyether and one part by volume of iso-octyl alcohol. This composition was then mixed into oil in the ratio of ten gallons of solution to fifty barrels (forty-two gallons per barrel) of lease crude oil. The resulting concentration of polyether in the oil was thus about 0.3 percent by volume.

The treating procedure consisted of heating about fifty barrels of the 0.3 percent solution and injecting it into the well annulus and then following it with about 200 barrels of crude oil from another lease. The oil from the other lease was heated to about 300° F. before injection. The other lease crude was employed because it could more safely be heated to a higher temperature. The oil was heated simply because hot oil treatments had been previously used to remove some of the paraffin. Field personnel summarized the results of several wells treated by my process. The results are presented in Table D.

*Table D*

| Months after treatment: | Oil production, bbl./day |
|---|---|
| Before treatment | 13 |
| 1 | 30 |
| 2 | 25 |
| 3 | 22 |
| 4 | 19 |
| 5 | 18 |
| 6 | 15 |

According to the field report these figures are averages for twenty of the fifty-five wells treated. There is little question of the success of the treatments. It should be noted, however, that some of the increased production must be attributed to the hot oil which was known to produce some improvement.

EXAMPLE V

A more clear-cut case of paraffin removal occurred in an Oklahoma field. In this case paraffin was complicating the operation of a well which was being pumped by a bottom-hole fluid-actuated pump. The use of soluble plugs in the producing tubing almost every day was required to prevent a serious plugging action. This well was treated with a polyether containing about twenty-five percent polyoxyethylene and based on a polypropylene glycol of about 2,000 molecular weight. The polyether was introduced into the well as a solution consisting of one part by volume of iso-octyl alcohol and two parts by volume of the polyether. A little more than a gallon a day of the solution was used. No paraffin difficulties were observed for six days. Then a soluble plug was run through the producing tubing to determine if any paraffin was present. Very little paraffin was found in the tubing. There is, of course, some question whether this action should be called remedial or preventive. That is, the treatments might be preventing emulsification and deposition of paraffin or they might be simply removing the paraffin each day. At the last report the quantity of treating solution was being reduced to determine how small an amount would be effective.

EXAMPLE VI

A well in Kansas was thought to need cleaning out. Therefore, several gallons of the treating solution described in Example V were poured down the tubing-casing annulus. The field was well pleased with the cleanout operation. More important, for several weeks after treatment a previously severe emulsion problem was eliminated. This seems to be a case of emulsion prevention. It illustrates how my composition can be used to prevent emulsions of oil and water even if no serious paraffin problem is present.

I claim:
1. A composition for removing paraffin from surfaces, said composition consisting essentially of from about 0.03 to about eighty percent by volume of an aliphatic alcohol having from about six to about ten carbon atoms per molecule, from about 0.05 to about seventy-five percent by volume of an ethoxylated polypropylene glycol, and from zero to about 99.9 percent by volume of a hydrocarbon oil, the ratio of said alcohol to said ethoxylated polypropylene glycol being between about one to three and about four to one, said ethoxylated polypropylene glycol being based on polypropylene glycol having an average molecular weight of from about 900 to about 3500, and said ethoxylated polypropylene glycol having an average polyoxyethylene portion equal to from about six to about forty percent of the total average molecular weight of the molecules.

2. The composition of claim 1 in which said alcohol is iso-octyl alcohol.

3. The composition of claim 1 in which said ethoxylated polypropylene glycol is based on a polypropylene glycol having an average molecular weight between about 1500 and about 2500, and said ethoxylated polypropylene glycol has an average polyoxyethylene portion equal to from about eight to about nineteen percent of the total average molecular weight of the molecules.

4. The composition of claim 3 in which said alcohol is iso-octyl alcohol.

5. A method for removing paraffin from surfaces in wells and flow lines comprising placing in contact with said paraffin the composition of claim 1 and subsequently flushing said surfaces with a liquid agent selected from the group consisting of water, hydrocarbon oil, and mixtures of said water and oil.

6. A method for removing paraffin from surfaces in wells and flow lines comprising placing in contact with said paraffin a composition consisting essentially of from about 2.5 to about eighty percent by volume of an aliphatic alcohol having from about six to about ten carbon atoms per molecule, from about 2.0 to about seventy-five percent by volume of an ethoxylated polypropylene glycol, and from zero to about ninety percent of a hydrocarbon oil, and subsequently flushing said surfaces with water, whereby the paraffin is emulsified in the water and is removed from the surfaces, the ratio of said alcohol to said ethoxylated polypropylene glycol being between about one to three and about four to one, said ethoxylated polypropylene glycol being based on a polypropylene glycol having an average molecular weight between about 1500 and about 3500, and said ethoxylated polypropylene glycol having an average polyoxyethylene portion equal to from about eight to about thirty percent of the total average molecular weight of the molecules.

7. The method of claim 6 in which said ethoxylated polypropylene glycol is based on a polypropylene glycol having an average molecular weight between about 1500 and about 2500, and said ethoxylated polypropylene glycol has an average polyoxyethylene portion equal to from about eight to about nineteen percent of the total average molecular weight of the molecules.

8. A method for preventing the formation of water-in-paraffin emulsions in wells comprising maintaining a volume of oil in the bottom of said well and introducing into said oil an aliphatic alcohol and an ethoxylated polypropylene glycol, the ratio of alcohol to ethoxylated polypropylene glycol being between about one to three and about four to one, said alcohol having from about six to about ten carbon atoms per molecule, said ethoxylated polypropylene glycol being based on polypropylene glycol having an average molecular weight of from about 900 to about 3500 and said ethoxylated polypropylene glycol having an average polyoxyethylene portion equal to from about six to about forty percent of the total average molecular weight of the molecules.

9. The method of claim 8 in which said ethoxylated polypropylene glycol is based on a polypropylene glycol having an average molecular weight between about 1500 and about 2500, and said ethoxylated polypropylene glycol has an average polyoxyethylene portion equal to from about eight to about nineteen percent of the total average molecular weight of the molecules.

References Cited in the file of this patent

UNITED STATES PATENTS

| | | |
|---|---|---|
| 2,356,254 | Lehmann et al. | Aug. 22, 1944 |
| 2,602,778 | Snyder et al. | July 8, 1952 |
| 2,674,619 | Lundsted | Apr. 6, 1954 |
| 2,817,635 | Goldman et al. | Dec. 24, 1957 |
| 2,836,559 | Bock et al. | May 27, 1958 |
| 2,927,078 | Nathan | May 1, 1960 |
| 2,978,026 | Bemis | Apr. 4, 1961 |
| 2,981,684 | Barnes et al. | Apr. 25, 1961 |

FOREIGN PATENTS

| | | |
|---|---|---|
| 572,523 | Canada | Mar. 17, 1959 |
| 592,020 | Canada | Feb. 2, 1960 |
| 631,926 | Canada | Nov. 28, 1961 |
| 803,544 | Great Britain | Oct. 29, 1958 |